No. 829,402. PATENTED AUG. 28, 1906.
R. HUFF.
STEERING GEAR AND MOTOR CONTROLLING MECHANISM FOR MOTOR VEHICLES.
APPLICATION FILED APR. 6, 1906.
2 SHEETS—SHEET 1.
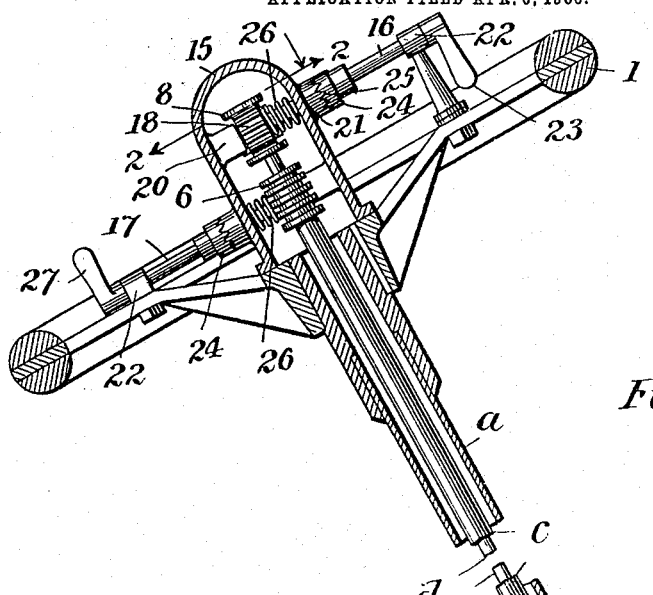
Fig. 1.
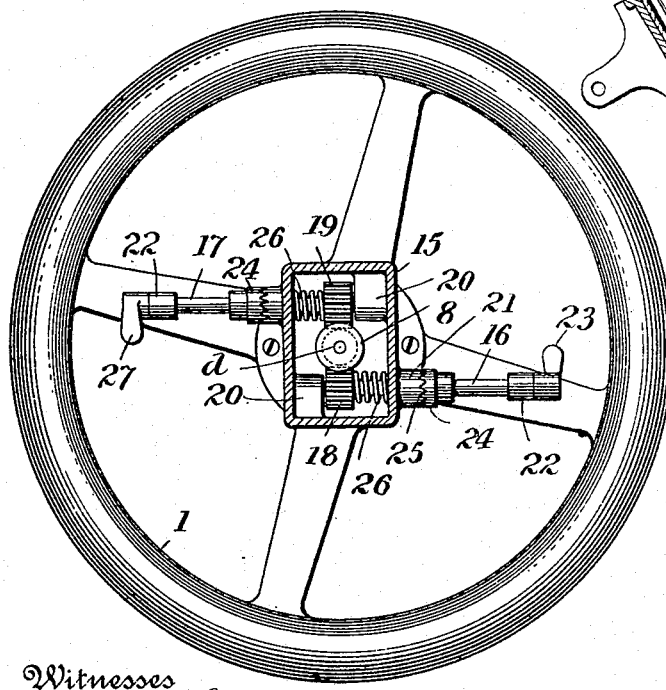
Fig. 2.
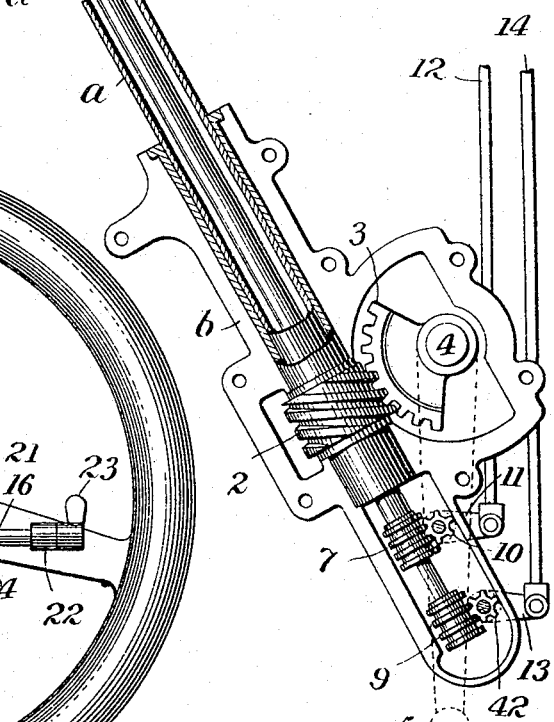
Witnesses
Inventor
Russell Huff

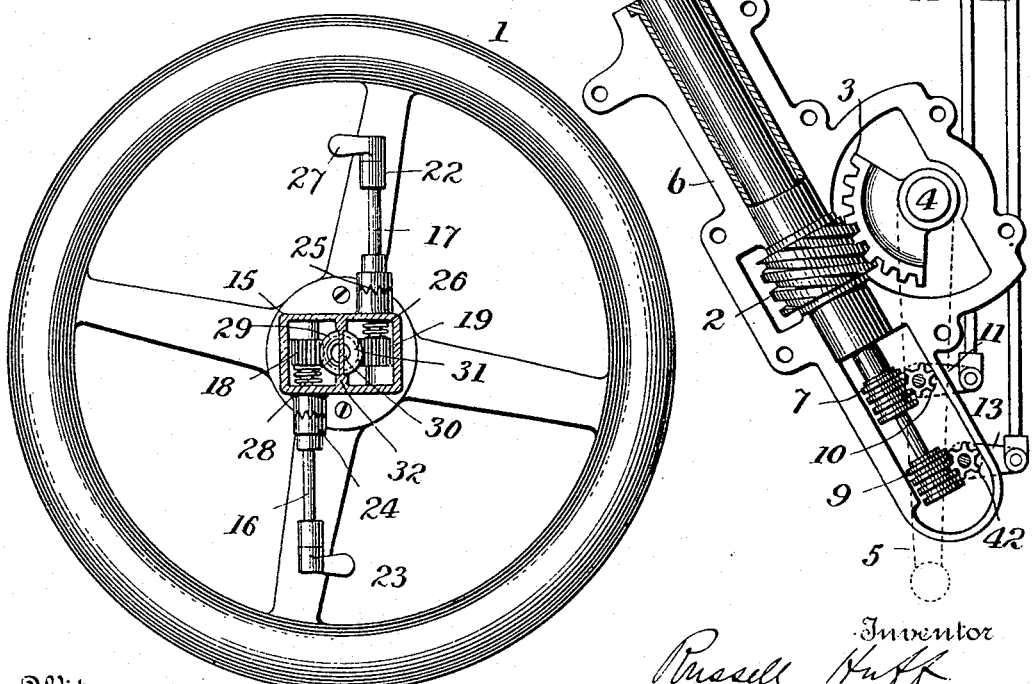

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

STEERING-GEAR AND MOTOR-CONTROLLING MECHANISM FOR MOTOR-VEHICLES.

No. 829,402.     Specification of Letters Patent.     Patented Aug. 28, 1906.

Application filed April 6, 1906. Serial No. 310,303.

*To all whom it may concern:*

Be it known that I, RUSSELL HUFF, a citizen of the United States, and a resident of Detroit, Wayne county, State of Michigan, have invented certain new and useful Improvements in Steering-Gear and Motor-Controlling Mechanism for Motor-Vehicles, of which the following is a specification.

This invention comprises improvements in motor-control mechanism for motor-vehicles, and it relates more especially to improvements in that class of motor-control devices illustrated in the patent to Charles Schmidt, No. 775,991, dated November 29, 1904.

In the present invention the motor-controlling rods are preferably arranged within the tubular steering shaft or stem of the vehicle, and they both extend below the stem and are provided with circular racks. In the preferred form the upper ends are also provided with circular racks. Means for operating these rods are preferably mounted upon the wheel or handle of the steering shaft or stem.

In the accompanying drawings, Figure 1 is a vertical section through the steering-stem of a motor-vehicle, illustrating one form of the invention. Fig. 2 is a section on the line 2 2 of Fig. 1. Fig. 3 is a vertical section through a steering-stem, showing a modified arrangement of the upper racks, and Fig. 4 is a section on the line 4 4 of Fig. 3.

Referring to Figs. 1 and 2 of the drawings, $a$ indicates the tubular steering-stem of a motor-vehicle, which is suitably supported at its lower end in a bearing $b$. A hand-wheel 1 is secured to the upper end of the stem, and a worm 2, secured to the stem at its lower end, engages a sector 3 on a shaft 4, the latter having a rocker-arm 5 thereon for communicating motion to the connecting-rods which guide the wheels.

Within the steering-stem is arranged a tubular motor-controlling rod $c$, having at its upper and lower ends cylindrical racks 6 and 7, respectively, and within the tubular rod $c$ is arranged a longer motor-controlling rod $d$, having similar cylindrical racks 8 and 9 at its upper and lower ends, respectively. The cylindrical rack 7 at the lower end of the motor-controlling rod $c$ engages a spur-pinion 10, which when the rod is moved longitudinally actuates an arm 11 and suitable connections 12 for adjusting either the throttle or the spark mechanism of the motor. The circular rack 9 upon the motor-controlling rod $d$ similarly engages a spur-pinion 42, which when the rod is moved longitudinally operates a lever 13 and suitable connections 14 for adjusting the spark mechanism or the throttle mechanism of the motor. It will be understood that if the arm 13 is connected to the throttle mechanism the arm 11 will be connected to the spark mechanism, and vice versa.

As the rods $c$ and $d$ and the racks 7 and 9 are concentric with the axis of the steering-stem, it will be evident that any rotary movement of the stem or of the rods will not affect the adjustment of the motor-controlling mechanism nor cause the parts to bind.

A housing 15, secured to the hub of the steering-wheel, extends over the ends of the rods $c$ and $d$, as shown, and rock-shafts 16 and 17, arranged parallel with the plane of the wheel-rim, extend in to the housing at opposite sides of the rods $c$ and $d$, and these shafts are provided with spur-pinions 18 and 19, which engage the cylindrical racks 8 and 6, respectively. As shown, the rock-shaft 16 is journaled in bearings 20 and 21 at opposite sides of the housing 15 and also in a bearing 22, secured to the hand-wheel. A finger-piece 23 projects at right angles to the shaft at its outer end, so that the shaft may be readily turned by applying pressure to said finger-piece; but the shaft is prevented from accidental rotation and is held in any desired position of adjustment by means of a collar 24, secured to the shaft 16 and having a notched face 25, which is held in engagement with a similarly-notched face on the bearing 21 by a spring 26, interposed between the pinion 18 and one wall of the housing 15. The shaft 17, as shown, is arranged in substantially the same way as the shaft 16, although closer to the hand-wheel, and its finger-piece 27 projects upwardly, while the finger-piece 23 on the shaft 16 projects downwardly.

It will be readily seen that any movement of the finger-piece 23 or 27 will cause a corresponding upward or downward movement of the controlling-rods $d$ or $c$ and an adjustment of the corresponding motor-controlling device. In the form of device shown in Figs. 1 and 2, as the rods have cylindrical racks at both ends, the rods may turn with the steering-stem, or the steering-stem may turn without causing rotation of the rods; but in any event the rotation of the stem will not effect the longitudinal adjustment of the rods, and therefore will not affect the adjustment of the spark or throttle controlling devices.

Instead of providing cylindrical racks at the upper ends of the controlling-rods, so that the rods may turn relatively to the pinions upon the adjusting-shafts 16 and 17, the rods may be made to turn with the hand-wheel and steering-stem, and the racks at the upper ends of the rods may be rectangular or any other suitable form in cross-section.

In Figs. 3 and 4 the upper portion of the tubular controlling-rod c is cut away, leaving a semicylindrical part 28, to which is secured a semicylindrical rack 29. Similarly the central rod d has a part cut away at its upper end, leaving a stem 30, upon which is arranged a rack 31. In order to prevent the rods from turning, the housing 15ª is provided with a central partition 32, which extends down between the parts 28 and 30 of the rods and forms a bearing which guides the rods. The racks are held between the pinions 18 and 19 and the partition, and it will be evident that when the hand-wheel and steering-stem are turned the controlling-rods will also turn; but by reason of the circular racks at the lower ends of the rods the motor-controlling mechanism will not be affected by the turning of the rods or the stem. The racks 29 and 31 may obviously be rectangular in cross-section instead of semicircular, as shown, since these racks do not in this form of invention turn relatively to their engaging pinions.

What I claim is—

1. In a motor-vehicle, motor-controlling devices comprising a pair of parallel rods mounted in a suitable support and adapted to be reciprocated, laterally-extending shafts having geared connections with the upper ends of said rods, circular racks connected to the lower ends of said rods, pinions meshing with said circular racks, and connections from said pinions extending to the motor mechanism.

2. In a motor-vehicle, the combination with a suitable support, of two concentric rods, laterally-extending shafts geared to said rods and adapted to reciprocate the same, circular racks upon the lower ends of said rods, and pinions meshing with said racks, for the purpose set forth.

3. In a motor-vehicle, the combination with a suitable support, of motor-control devices comprising two concentric rods, circular racks upon the upper ends of said rods, laterally-extending shafts having pinions meshing with said racks, circular racks at the lower ends of said rods, and pinions meshing with said latter racks, for the purpose set forth.

4. In a motor-vehicle, in combination, a steering shaft or stem, two longitudinally-movable motor-controlling rods, each having a rack at its upper end, and an adjusting-shaft for each rod, each shaft having a toothed member engaging one of said racks.

5. In a motor-vehicle, in combination, a steering shaft or stem, two longitudinally-movable motor-controlling rods, each having a concentric rack at its upper end and an adjusting-shaft for each rod, each shaft having a toothed member engaging one of said racks.

6. In a motor-vehicle, in combination, a steering shaft or stem, two motor-controlling rods, each rod having a concentric rack at its lower end, and means for adjusting each rod longitudinally with respect to the stem.

7. In a motor-vehicle, in combination, a steering shaft or stem, two motor-controlling rods arranged within the stem, each rod having a concentric rack at its lower end and a rack at its upper end, and an adjusting-shaft for each rod, each shaft having a toothed member engaging the upper rack on the rod.

8. In a motor-vehicle, in combination, a steering shaft or stem, two motor-controlling rods arranged within the stem, each rod having a concentric rack at its lower end and a concentric rack at its upper end, and an adjusting-shaft for each rod, each shaft having a toothed member engaging the upper rack on the rod.

9. In a motor-vehicle, in combination, a steering shaft or stem, two adjusting-shafts journaled transversely at the upper end of the stem, two motor-controlling rods movable longitudinally with respect to the stem and connections between said shafts and rods whereby the rocking of the shafts will cause longitudinal movement of the rods.

10. In a motor-vehicle, in combination, a steering shaft or stem, a housing at the upper end of the stem, two adjusting-shafts journaled transversely in said housing, each shaft having a toothed member thereon, and two motor-controlling rods longitudinally movable with respect to the stem, each rod having a rack engaging the toothed member on one of said shafts.

11. In a motor-vehicle, in combination, a steering shaft or stem, a housing at the upper end of the stem, two adjusting-shafts journaled transversely in said housing, each shaft having a toothed member thereon, and two motor-controlling rods longitudinally movable with respect to the stem and each rod having a concentric rack engaging the toothed member on one of said shafts.

In testimony whereof I affix my signature in presence of two witnesses.

RUSSELL HUFF.

Witnesses:
 F. E. PAINE, Jr.,
 VINCENT LINK.